(12) United States Patent
Lange et al.

(10) Patent No.: US 9,600,805 B2
(45) Date of Patent: Mar. 21, 2017

(54) PRESENTING INFORMATION ON A MOBILE COMMUNICATION DEVICE

(71) Applicants: Stephan Lange, St. Leon-Rot (DE);
Manuela Janicki, Karlsruhe (DE);
Torsten Wichmann, Dielheim (DE)

(72) Inventors: Stephan Lange, St. Leon-Rot (DE);
Manuela Janicki, Karlsruhe (DE);
Torsten Wichmann, Dielheim (DE)

(73) Assignee: SAP SE, Walldorf (DE)

( * ) Notice: Subject to any disclaimer, the term of this patent is extended or adjusted under 35 U.S.C. 154(b) by 183 days.

(21) Appl. No.: 13/926,690

(22) Filed: Jun. 25, 2013

(65) Prior Publication Data

US 2014/0380181 A1 Dec. 25, 2014

(51) Int. Cl.
| | | |
|---|---|---|
| *G06F 3/00* | (2006.01) | |
| *G06F 3/048* | (2013.01) | |
| *G06Q 10/10* | (2012.01) | |
| *G06F 17/30* | (2006.01) | |
| *G06F 15/177* | (2006.01) | |
| *G06F 3/14* | (2006.01) | |

(52) U.S. Cl.
CPC ....... *G06Q 10/105* (2013.01); *G06F 17/3087* (2013.01); *G06F 17/30241* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,084,510 | A * | 7/2000 | Lemelson | G08B 15/004 340/539.13 |
| 6,167,394 | A * | 12/2000 | Leung | G06F 17/30241 |
| 6,369,705 | B1 * | 4/2002 | Kennedy | G01S 5/0027 340/506 |
| 6,938,242 | B2 * | 8/2005 | Limousin | G06Q 10/06 715/751 |
| 7,143,419 | B2 * | 11/2006 | Fischer | G06F 8/60 707/999.01 |
| 7,237,189 | B2 | 6/2007 | Altenhofen et al. | |
| 7,272,782 | B2 * | 9/2007 | Sneh | G06F 17/243 707/E17.12 |
| 7,277,018 | B2 * | 10/2007 | Reyes | G08B 7/06 340/521 |
| 7,312,712 | B1 * | 12/2007 | Worrall | G06Q 10/06 340/309.16 |
| 7,343,303 | B2 * | 3/2008 | Meyer | G06Q 10/0635 705/325 |
| 7,401,187 | B2 | 7/2008 | Lange | |
| 7,424,470 | B2 | 9/2008 | Pfeifer et al. | |

(Continued)

*Primary Examiner* — Yongjia Pan
(74) *Attorney, Agent, or Firm* — Fish & Richardson P.C.

(57) ABSTRACT

Techniques for presenting information on a mobile communication device to an employee of an organization include receiving an indication to present information associated with an organization to an employee of the organization; in response to receiving the indication, determining a current geographic location of the employee; identifying a facility of a plurality of facilities associated with the organization based on the determined current geographic location of the employee; retrieving information associated with the identified facility from a local memory of the mobile communication device; and presenting the retrieved information to the employee.

23 Claims, 6 Drawing Sheets

(56) References Cited

U.S. PATENT DOCUMENTS

| | | | |
|---|---|---|---|
| 7,532,906 B2 | 5/2009 | Enenkiel | |
| 7,603,361 B2 | 10/2009 | Clemens et al. | |
| 7,689,612 B2 | 3/2010 | Helsen et al. | |
| 7,783,500 B2* | 8/2010 | Meyer | G06Q 10/06 705/1.1 |
| 7,818,365 B2 | 10/2010 | Velline et al. | |
| 7,853,240 B2 | 12/2010 | Abel-Kader et al. | |
| 7,860,835 B2 | 12/2010 | Lange et al. | |
| 7,904,400 B2* | 3/2011 | Bussert | G06F 9/4446 706/14 |
| 7,908,584 B2 | 3/2011 | Singh et al. | |
| 7,924,149 B2* | 4/2011 | Mendelson | G01C 21/206 340/539.11 |
| 8,065,673 B2* | 11/2011 | D'Souza | G06F 9/485 709/203 |
| 8,068,020 B2* | 11/2011 | Dilbeck | G06Q 10/06 340/506 |
| 8,121,985 B2 | 2/2012 | Krebs et al. | |
| 8,127,237 B2 | 2/2012 | Beringer | |
| 8,145,183 B2* | 3/2012 | Barbeau | H04M 3/42348 455/404.1 |
| 8,145,728 B2* | 3/2012 | Whittaker | G06Q 30/0267 705/14.64 |
| 8,219,318 B2* | 7/2012 | Kreft | 701/445 |
| 8,245,128 B1 | 8/2012 | Ahad et al. | |
| 8,249,886 B2* | 8/2012 | Meyer | G06Q 10/0635 705/1.1 |
| 8,250,169 B2 | 8/2012 | Beringer et al. | |
| 8,255,429 B2 | 8/2012 | Lange et al. | |
| 8,255,548 B2* | 8/2012 | Hopkins | G06F 17/30861 709/229 |
| 8,265,344 B2* | 9/2012 | Nielsen et al. | 382/109 |
| 8,275,352 B2 | 9/2012 | Forstall et al. | |
| 8,285,258 B2 | 10/2012 | Schultz et al. | |
| 8,307,299 B2* | 11/2012 | Conner | G06Q 10/10 715/778 |
| 8,326,338 B1 | 12/2012 | Vasilevsky | |
| 8,368,695 B2* | 2/2013 | Howell | G06F 17/30241 345/427 |
| 8,631,161 B2* | 1/2014 | Lavrov | G06F 17/30241 709/248 |
| 8,669,882 B2* | 3/2014 | Donaghey | G01D 4/004 340/438 |
| 8,769,073 B2* | 7/2014 | Humphreys | G06F 17/30902 707/610 |
| 8,775,195 B2* | 7/2014 | Stiles | G06Q 10/06 705/1.1 |
| 8,805,698 B2* | 8/2014 | Stiles | G06Q 10/06 705/1.1 |
| 8,892,989 B1* | 11/2014 | Lieb | G06F 17/30994 715/205 |
| 2002/0006787 A1* | 1/2002 | Darby | 455/419 |
| 2002/0133406 A1* | 9/2002 | Kujirai et al. | 705/14 |
| 2003/0013438 A1* | 1/2003 | Darby | 455/419 |
| 2003/0115113 A1* | 6/2003 | Duncan | G06Q 30/02 705/26.1 |
| 2003/0225687 A1* | 12/2003 | Lawrence | G06Q 30/02 705/38 |
| 2004/0204837 A1* | 10/2004 | Singleton | 701/209 |
| 2004/0221289 A1* | 11/2004 | D'Souza | G06F 9/485 718/102 |
| 2005/0013417 A1* | 1/2005 | Zimmers | G08B 27/005 379/37 |
| 2005/0055308 A1* | 3/2005 | Meyer | G06Q 10/0635 705/38 |
| 2005/0144062 A1* | 6/2005 | Mittal | G06Q 10/06311 705/7.15 |
| 2005/0182722 A1* | 8/2005 | Meyer | G06Q 10/06 705/40 |
| 2006/0094949 A1* | 5/2006 | Coonce | A61B 5/0002 600/407 |
| 2006/0118636 A1* | 6/2006 | Miles | A62B 99/00 235/472.01 |
| 2007/0005643 A1* | 1/2007 | Korman | 707/104.1 |
| 2007/0033155 A1* | 2/2007 | Landsman | G06F 17/30899 |
| 2007/0067391 A1* | 3/2007 | Masciantonio et al. | 709/204 |
| 2007/0078950 A1* | 4/2007 | Hopkins | G06F 17/30861 709/217 |
| 2007/0088567 A1* | 4/2007 | Berkelhamer | G06F 19/3456 705/2 |
| 2007/0088590 A1* | 4/2007 | Berkelhamer | G06F 19/3456 705/28 |
| 2007/0168225 A1* | 7/2007 | Haider | G06Q 50/22 705/2 |
| 2007/0204057 A1 | 8/2007 | Shaver et al. | |
| 2007/0300243 A1 | 12/2007 | Gross et al. | |
| 2008/0052142 A1* | 2/2008 | Bailey | G06Q 10/00 705/7.13 |
| 2008/0086540 A1* | 4/2008 | Scott | H04L 67/289 709/217 |
| 2008/0201073 A1* | 8/2008 | Adachi et al. | 701/210 |
| 2008/0256044 A1* | 10/2008 | Anderson | G06F 17/3087 |
| 2008/0278311 A1* | 11/2008 | Grange | G01C 21/36 340/539.13 |
| 2009/0005068 A1* | 1/2009 | Forstall | H04M 3/42365 455/456.1 |
| 2009/0198733 A1* | 8/2009 | Gounares | G06F 19/3418 |
| 2009/0216438 A1* | 8/2009 | Shafer | 701/210 |
| 2010/0293005 A1* | 11/2010 | Glimp | G06F 19/327 705/2 |
| 2011/0010087 A1 | 1/2011 | Wons et al. | |
| 2011/0022433 A1* | 1/2011 | Nielsen | G06Q 10/06 705/7.27 |
| 2011/0288895 A1* | 11/2011 | Perez, Jr. | G06Q 10/06 705/7.12 |
| 2013/0054551 A1 | 2/2013 | Lange | |
| 2013/0073996 A1* | 3/2013 | Garcia | G06Q 10/0637 715/764 |
| 2013/0086108 A1* | 4/2013 | Ramaswamy et al. | 707/770 |
| 2013/0120140 A1* | 5/2013 | Patil | G06F 19/3418 340/539.12 |
| 2013/0159203 A1* | 6/2013 | Munzer et al. | 705/321 |
| 2013/0166607 A1* | 6/2013 | Turk | G06Q 10/04 707/803 |
| 2013/0238975 A1* | 9/2013 | Chan | G06F 17/30902 715/234 |
| 2013/0339341 A1* | 12/2013 | Fan | G06Q 10/02 707/722 |
| 2014/0279666 A1* | 9/2014 | Lievens et al. | 705/339 |
| 2014/0324779 A1* | 10/2014 | Forbes | G06F 17/30575 707/634 |

\* cited by examiner

602 — Back | Medical Emergency

Contact the Control Room or the Facility Center for help. If required, they will call external medical assistance and provide them access to the XYZ location.

Phone Numbers

604

Control Room
Occupied 24/7 by security guards
Tel: +123-4-567014

Control Room
Alternative number
Tel: +123-4-567016

Facility Center
Occupied during work days
Tel: +123-4-567000

A.B.C.D.E.F.
Private care company. XYZ subscriber number: 987654
Tel: 1-800-234-5678 # 987654

N.M.O.
Public medical care agency
Tel: 101

Further Information

606

Further Health Information
Find further information related to medical emergencies

International ABC
XYZ membership number: 12ABCD000034

PRESENTING INFORMATION ON A MOBILE COMMUNICATION DEVICE

TECHNICAL BACKGROUND

This disclosure relates to presenting information and, more particularly, presenting emergency assistance information on mobile communication device.

BACKGROUND

Organizations typically provide emergency contact information for its employees to use when an emergency occurs. To find the emergency contact information, an employee typically searches the organization's handbook, website, or intranet. This may involve, for example, reading through a table of contents of the handbook, or navigating through various menus or reading through a list of search results on the website or intranet until the relevant information is found. Searching for the relevant information during an emergency situation may be a frustrating and time consuming task, especially for an employee of a large organization with many different departments in many different locations. Furthermore, if an employee has traveled a considerable distance away from his office, he may not have access to the organization's handbook, website, or intranet to search for the information. Additionally, the employee may not know what emergency contact information to use to obtain assistance at his current location.

SUMMARY

This disclosure describes systems, methods, apparatus, and computer-readable media for presenting information on a mobile communication device including, for example, the features of receiving an indication to present information associated with an organization to an employee of the organization; in response to receiving the indication, determining a current geographic location of the employee; identifying a facility of a plurality of facilities associated with the organization based on the determined current geographic location of the employee; retrieving information associated with the identified facility from a local memory of the mobile communication device; and presenting the retrieved information to the employee.

A first aspect combinable with any of the general embodiments includes storing, for each facility of the plurality of facilities associated with the organization, information associated with the facility in the local memory of the mobile communication device prior to receiving the indication.

In a second aspect combinable with any of the general embodiments, receiving the indication to present information associated with the organization to the employee of the organization includes receiving an input from the employee for accessing information associated with the organization.

In a third aspect combinable with any of the general embodiments, receiving the indication to present information associated with the organization to the employee of the organization includes receiving a notification from a computing system of the organization to present information associated with the organization to the employee of the organization, the computing system being remote from the mobile communication device.

In a fourth aspect combinable with any of the general embodiments, determining the current geographic location of the employee includes determining the current geographic location of the mobile communication device using a global positioning system (GPS).

In a fifth aspect combinable with any of the general embodiments, identifying the facility of the plurality of facilities associated with the organization based on the determined current geographic location of the employee includes determining, for each facility of the plurality of facilities, a distance between a geographic location of the facility and the current geographic location of the employee, the geographic location of the facility being previously stored in the local memory of the mobile communication device; identifying a shortest distance of the determined distances; and identifying the facility associated with the shortest distance as the facility that is nearest to the current geographic location of the employee.

In a sixth aspect combinable with any of the general embodiments, identifying the facility of the plurality of facilities associated with the organization based on the determined current geographic location of the employee includes identifying a situation or category associated with the determined current geographic location of the employee; and identifying the facility of the plurality of facilities associated with the organization based on the identified situation or category.

In a seventh aspect combinable with any of the general embodiments, presenting the retrieved information to the employee includes presenting one or more links to information stored in a remote storage medium accessible by the mobile communication device, the one or more links being previously stored in the local memory of the mobile communication device.

Particular implementations of the subject matter described in this disclosure can be implemented so as to realize one or more of the following advantages. An organization's information for the organization's facilities may be stored in employees' mobile communication devices and may be available offline to employees who have no data connection on their mobile communication devices. A mobile communication device may selectively present the stored information to an employee based on the employee's current geographic location. The employee may be presented with relevant information quickly, which may relieve the employee with the burden of searching for the relevant information, for example, during an emergency situation. Further information may be provided to the employees via links to online content such as content on the organization's webpage and intranet. The information available to the employees may be maintained and modified by a content editor of the organization and the offline information may be pushed to the mobile communication devices to update the offline information stored in the mobile communication devices.

These general and specific aspects may be implemented using a device, system, or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and the drawings, and from the claims.

DESCRIPTION OF DRAWINGS

FIGS. 5 and 6 show examples of user interfaces for presenting information.

DETAILED DESCRIPTION

In a general implementation of the present disclosure, a mobile communication device presents information, e.g., emergency assistance information, associated with an organization to an employee of the organization. An organization's information may include offline information and online information.

Offline information, in some aspects, includes information that is stored on the mobile communication device and is available offline for presentation to an employee without accessing a data network. The offline content may include the most important information that needs to be available when no access to a data network is available. Examples of offline information include emergency contact information such as names, addresses, and phone numbers of emergency services facilities associated with the organization and links to online information associated with the organization. An employee's mobile communication device may quickly and selectively present the stored emergency assistance information to the employee based on the employee's current geographic location.

Online information, in some aspects, includes information that is stored on a server and remote from the mobile communication device. The online information is accessed by the mobile communication device over a data network. The online information may include unstructured content that may vary. Examples of online information include information related to emergency service facilities such as descriptions, floor plans, images, and videos associated with the organization's emergency services facilities. The online information may be provided to the employee via offline links to online content, such as content on the organization's webpage and intranet.

The organization's information may be stored on a server and maintained by a content editor associated with the organization. The content editor may classify an item of information as offline information or online information. By classifying items of information, the content editor can specify which items are to be stored in employees' mobile communications devices and available offline to the employees. The offline information and updates to the offline information may be pushed to the employees' mobile communication devices for storage in the mobile communications devices.

Figure 1:
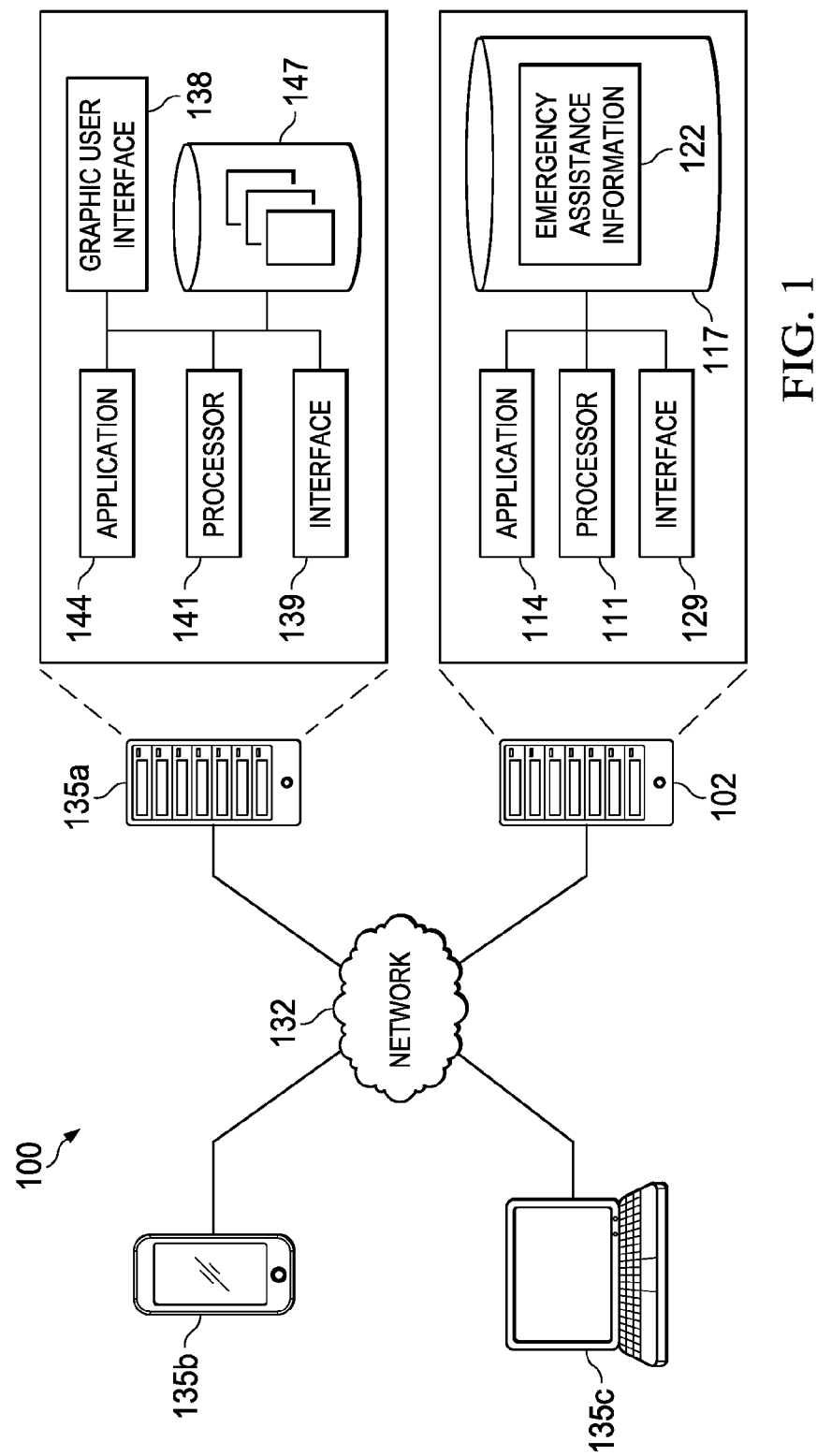
FIG. 1 shows an example of a distributed computing system environment operable to present information.

FIG. 1 shows an example of a distributed computing system environment 100 operable to present information, such as emergency assistance information. The environment 100 includes or is communicably coupled with a server 102 and one or more clients 135, at least some of which communicate across network 132. The server 102 stores one or more hosted applications 114, where at least a portion of the hosted applications 114 are executed via requests and responses sent to users or clients within and communicably coupled to the environment 100. An example of a hosted application 114 is an emergency assistance application. The emergency assistance application is executed by the server 102 to present emergency assistance information to users of the one or more clients 135.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, a virtual server, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, ABAP, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store emergency assistance information 122 that are used by the server 102 to present emergency assistance information to a user. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1.

There may be any number of clients 135 associated with, or external to, environment 100. For example, while illustrated environment 100 includes three clients (135*a*, 135*b*, and 135*c*), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
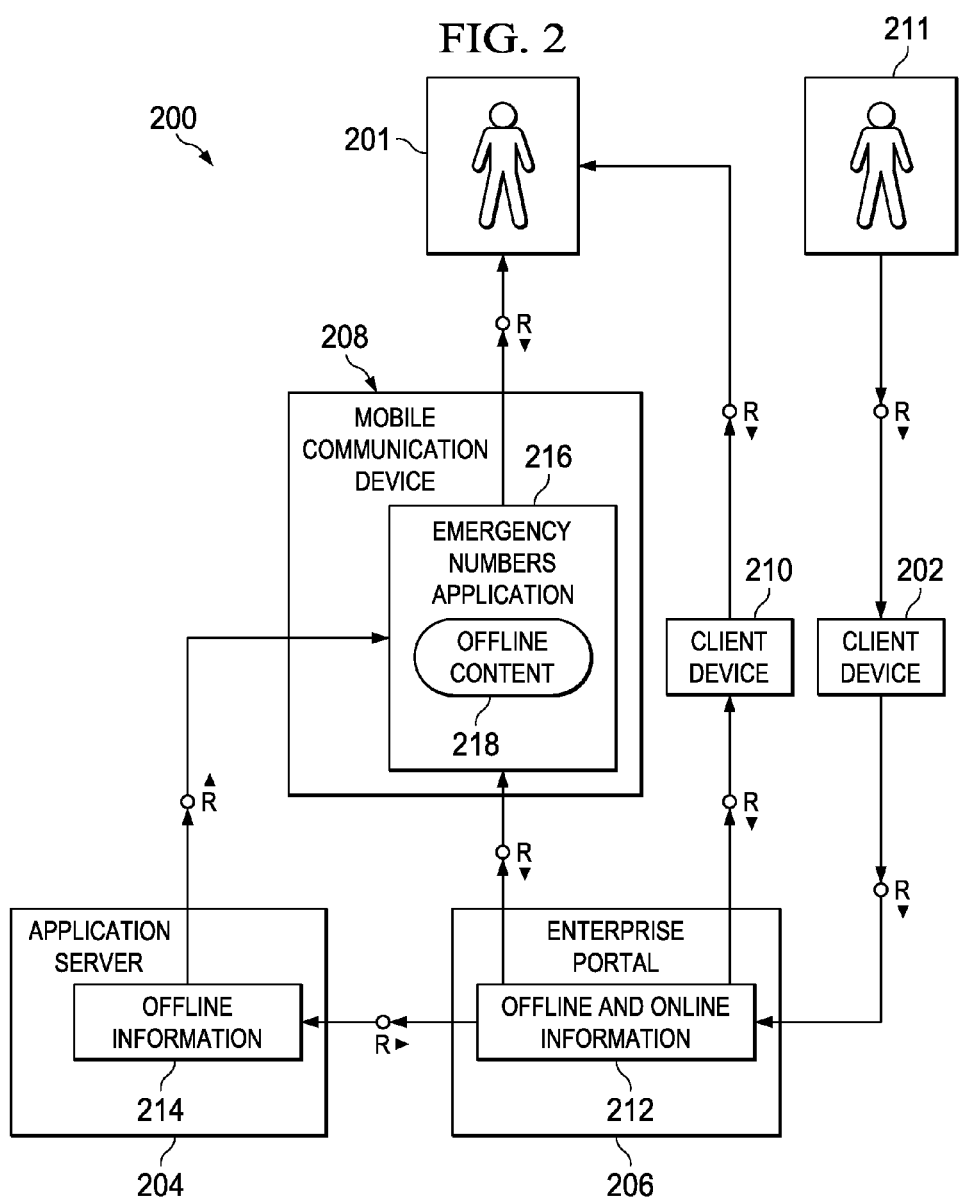
FIGS. 2 and 3 show block diagrams of examples of systems operable to present information.

FIG. 2 shows a block diagram of an example of a system 200 operable to present information such as emergency assistance information. The system 200 includes computing devices associated with an organization and computing devices associated with an employee 201 of the organization. The computing devices associated with the organization include a client 202, an application server 204, and an enterprise portal server 206. The computing devices associated with the employee 201 include a mobile communications device 208 and a client 210.

A content editor 211 can use the client 202 to maintain information, such as emergency numbers and other emergency related content, associated with the organization. The client 202 communicates with the enterprise portal server 206 where information 212 is stored. The information 212 stored in the enterprise portal server 206 includes offline information and online information. The client 202 updates the information 212 stored in the enterprise portal server 206 based on input from the content editor 211. The application server 204 communicates with the enterprise portal server 206 to retrieve offline information 214 and updates to the offline information 214.

The application server 204 communicates with the employee's mobile communication device 208 where an emergency information application 216 and offline emergency assistance information 218 are stored. The application server 204 may push updates to the emergency information application 216 and updates to the offline information 218 to the employee's mobile communication device 208.

The emergency information application 216 retrieves the offline information 218 stored in the mobile communication device 208 or the information 212 or 214 stored in the organization's computing devices 206 or 204, respectively. The emergency information application 216 generates user interfaces for presenting the retrieved information to the employee 201. The emergency information application 216 may retrieve and present the information based on the employee's current geographic location, based on availability of a data connection, or both. The employee 201 can use the mobile communication device 208 and the client device 210 to access online information 212 stored in the enterprise portal server 206. The online information 212 may be accessed via offline links presented to the employee 201.

The mobile communication device 208 may include circuitry and sensors for supporting a location determining capability, such as that provided by a Global Positioning System (GPS). In some implementations, a positioning system, such as a GPS receiver, can be integrated into the mobile communication device 208 to provide access to location information. The mobile communication device 208 can communicate with a GPS satellite through the GPS receiver to determine its position, location, or geographic area.

Figure 3:
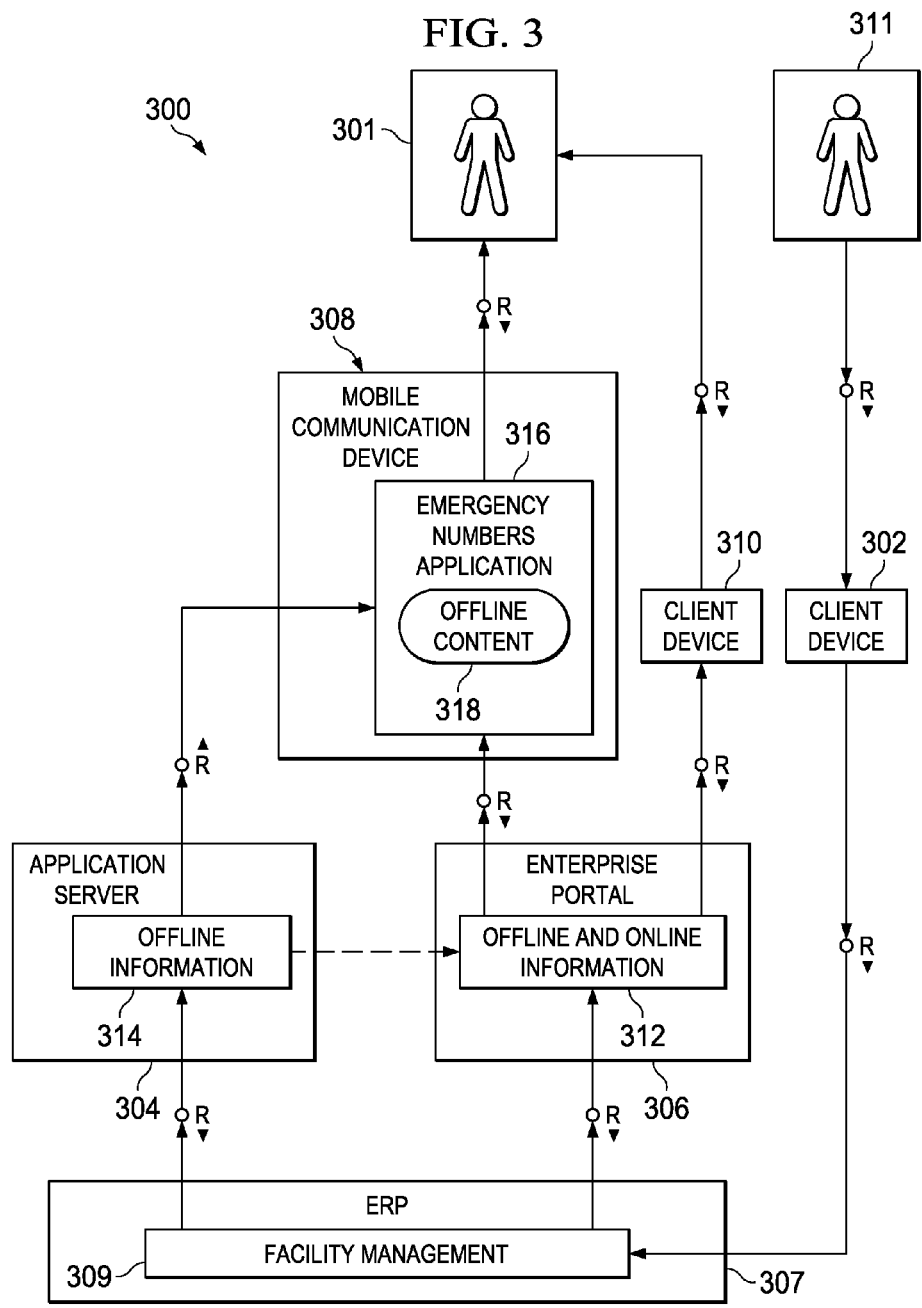

FIG. 3 shows a block diagram of an example of a system 300 operable to present information such as emergency assistance information. The system 300 includes computing devices associated with an organization and computing devices associated with an employee 301 of the organization. Similar to the system 200 of FIG. 2, the computing devices associated with the organization include a client 302, an application server 304, and an enterprise portal server 306, and the computing devices associated with the employee 301 include a mobile communications device 308 and a client 310. The system 300 of FIG. 3 includes an additional computing device associated with the organization, namely an enterprise resource planning (ERP) system 307.

A content editor 311 can use the client 302 to maintain information associated with the organization. In FIG. 3, the client 302 communicates with the ERP system 307 to update the information. The ERP system 307 includes facilities management software 309 for maintaining the information. The ERP system 307 communicates with the enterprise portal server 306 where information 312 is stored. The information 312 stored in the enterprise portal server 306 includes offline information and online information. The ERP system 307 communicates with the application server 304 where offline information 314 is stored. The ERP system 307 updates the information 312 stored in the enterprise portal server 306 and the offline information 314 stored in the application server 304 based on input entered into the client 302 by the content editor 311. In some implementations, the application server 304 may communicate with the enterprise portal server 306 to retrieve the offline information 314 and updates to the offline information 314.

The application server 304 communicates with the employee's mobile communication device 308 where an emergency information application 316 and offline emergency assistance information 318 are stored. The application server 304 may push updates to the emergency information application 316 and updates to the offline emergency assistance information 318 to the employee's mobile communication device 308.

The emergency assistance information application 316 retrieves the offline information 318 stored in the mobile communication device 308 or the information 312 or 314 stored in the organization's computing devices 306 or 304, respectively. The emergency information application 316 generates user interfaces for presenting the retrieved information to the employee 301. The application 316 may retrieve and present the information based on the employee's current geographic location, based on availability of a data connection, or both. The employee 301 can use the mobile communication device 308 and the client device 310 to access online information 312 stored in the enterprise portal server 306. The online information 312 may be accessed via offline links presented to the employee 301.

The mobile communication device 308 may include circuitry and sensors for supporting a location determining capability, such as that provided by a Global Positioning System (GPS). In some implementations, a positioning system, such as a GPS receiver, can be integrated into the mobile communication device 308 to provide access to location information. The mobile communication device 308 can communicate with a GPS satellite through the GPS receiver to determine its position, location, or geographic area.

Figure 4:
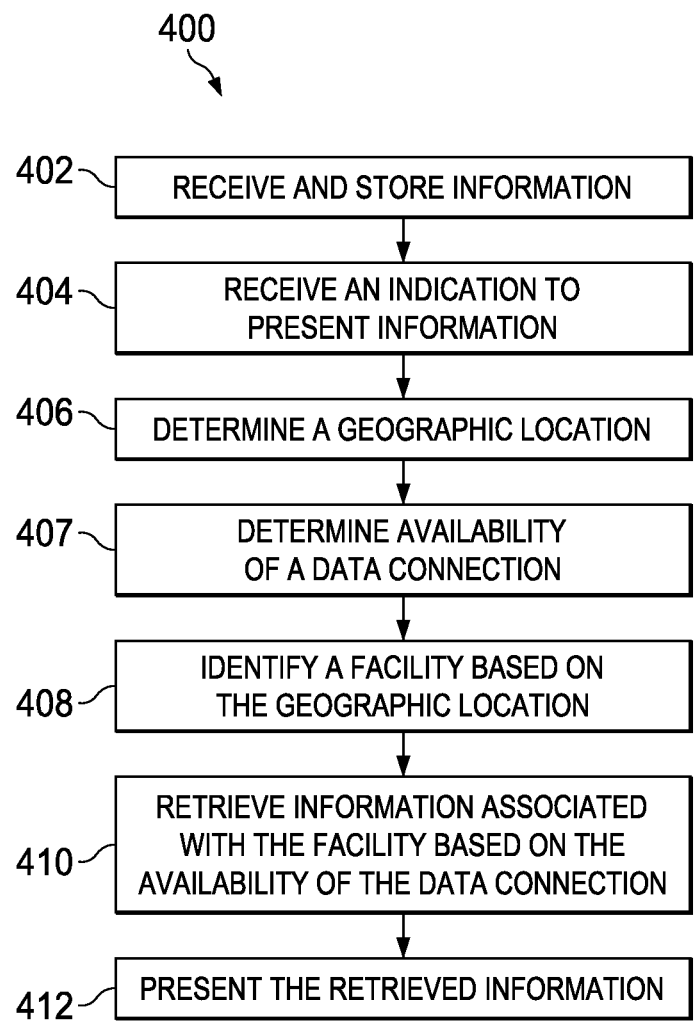
FIG. 4 shows a flowchart of examples of operations for presenting information on a mobile communication device.

FIG. 4 shows a flowchart of examples of operations 400 for presenting information to an employee of an organization. For purposes of illustration, the process 400 will be described with respect to a mobile communication device that performs the process 200 and one or more remote servers.

In FIG. 4, the mobile communication device receives information associated with the organization from a remote server associated with the organization and stores the information in a local memory at 402. The information may be received over a data connection between the mobile communication device and the remote server. The information may include software code, such as hypertext markup language (HTML) and Javascript code, of an application that is executed by the mobile communication device to present information to the employee. The information may include information for every facility, such as offices and warehouses, associated with the organization. The information may include emergency assistance information such as names, addresses, phone numbers, and hours of operations associated with emergency services facilities of the organization. The information may include links to online content, such as content on the organization's webpage and intranet. The information may include new information and updates to information previously stored in the mobile communication device.

At 404, the mobile communication device receives an indication to present information associated with the organization to the employee. In some implementations, the indication may be an input from the employee for accessing information associated with the organization. For example, the employee may select an icon displayed on a screen of the mobile device. In response to detecting a selection of the icon, the mobile communication device executes the software code of the application to present the information to the employee.

In some implementations, the indication to present information may be a notification from a remote server associated with the organization to present information associated with the organization to the employee. For example, the mobile communication device receives the notification from the remote server, and in response, executes the software code of the application to present the information to the employee.

In response to receiving the indication to present information, the mobile communication device determines a current geographic location of the employee at 406. The mobile communication device may determine the current geographic location using a positioning system. For example, the mobile communication device can determine the current geographic position using a GPS, cellular tower triangulation, Wi-Fi positioning, or any other suitable technologies or techniques, or a combination of technologies and techniques. A GPS signal may specify the geographic location in latitude and longitude coordinates. The mobile communication device may convert the coordinates to an address (e.g., street, city, state, country) by referencing a database of coordinates and locations stored in the local memory.

At 407, the mobile communication device determines availability of a data connection for receiving information from a server storing the organization's information. The mobile communication device may determine availability of a data connection by determining whether the mobile communication device is connected to a Wi-Fi network or a cellular data network over which data can be transferred between the mobile communication device and the server.

At 408, the mobile communication device identifies a facility associated with the organization based on the determined current geographic location of the employee. To identify the facility, the mobile communication device may search the information associated with the organization that was previously stored in the local memory or retrieved from a server associated with the organization over an available data connection. The information may include geographic location information for each facility associated with the organization. The geographic location information for each facility may be expressed in latitude and longitude coordinates or as an address. The mobile communication device may determine, for each facility associated with the organization, a distance between the geographic location of the facility and the current geographic location of the employee. Based on the determined distances between the geographic locations of the facilities and the current geographic location of the employee, the mobile communication device can identify a shortest distance and identify the facility associated with the shortest distance as the facility that is nearest to the current geographic location of the employee.

In some implementations, the mobile device may identify the facility based on a situation or category. For example, the mobile device may receive an input from the employee specifying the emergency situation or category. The input may be, for example, a selection of an emergency situation or category from a list of emergency situations or categories displayed on a user interface screen of the mobile communication device.

As another example, the mobile device may identify a situation or category associated with the determined current geographic location of the employee and identify the facility associated with the organization based on the identified situation or category. The mobile device may identify the situation or category associated with the current geographic location of the employee based on, for example, the notification received from the remote server to present information to the employee. The notification may include information indicating a geographic location and the situation or category associated with the geographic location. The information indicating the geographic location corresponding to the situation or category may be expressed in latitude and longitude coordinates or as an address. The information indication the situation or category may be, for example, a numerical value or a text string specifying the situation or risk category (e.g., 1 for earth quake, 2 for hurricane, 3 for tornado, 4 for terrorist activity, etc.). The mobile communication device may compare or compute a distance between the geographic location information received from the remote server and the current geographic location of the employee. If the geographic location included in the notification corresponds to (e.g., is within a certain distance of) the current geographic location of the employee, the mobile communication device may identify the facility based on the situation or risk category.

To identify the facility based on the situation or category, the mobile communication device may search the information associated with the organization that was previously stored in the local memory. The information may include situations and categories associated with each facility. The mobile device may identify the facility associated with the situation or category that matches the identified situation or category.

At 410, the mobile communication device retrieves information associated with the identified facility. The mobile communication device may retrieve the information from the local memory of the mobile communication device or a remote server based on the availability of the data connection. The retrieved information may include names, addresses, phone numbers, and hours of operation associated with the identified facility. The retrieved information may include offline links to online content, such as content stored in a remote server associated with the organization.

At 412, the mobile communication device presents the retrieved information to the employee. Presenting the retrieved information may include presenting the offline links to the online content. To present the information to the employee, the mobile communication device generates one or more user interfaces for displaying the information on a screen of the mobile communication device.

Figure 5:
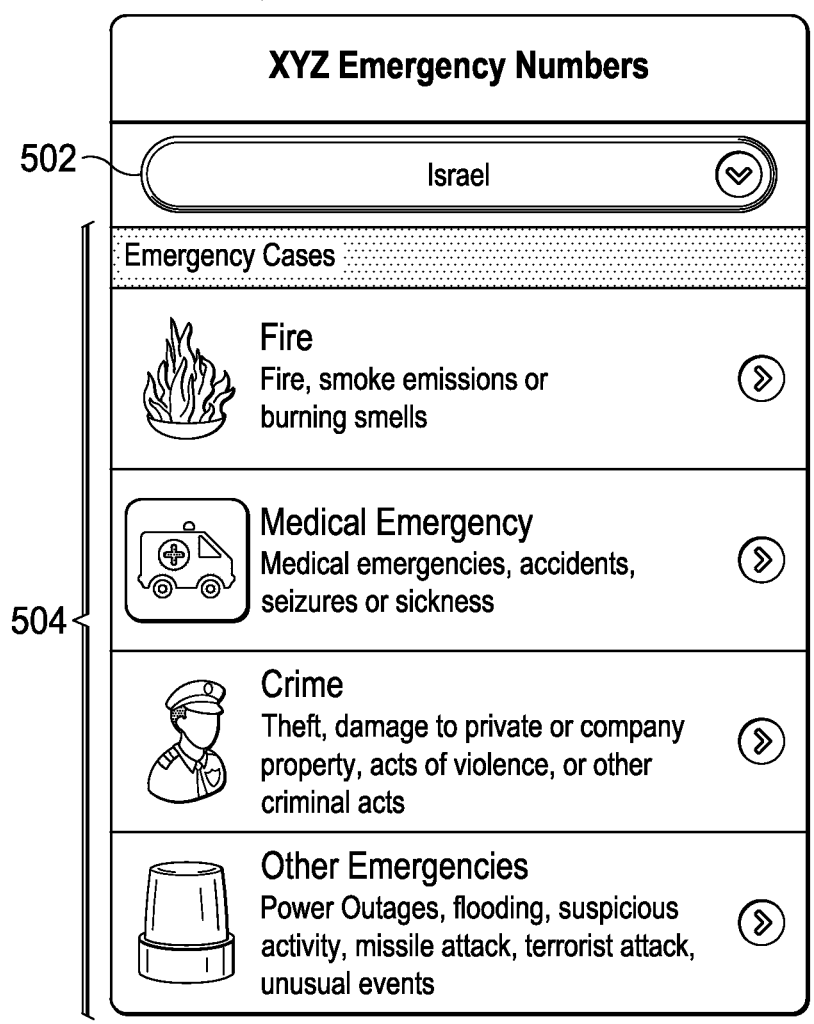

FIG. 5 shows an example of a user interface 500 of a mobile communication device for presenting information such as emergency assistance information. The user interface 500 displays information determined by the mobile communication device and emergency assistance information. The emergency assistance information may be offline information that was previously stored in a memory of the mobile communication device or online information retrieved from a server. The user interface 500 displays the current geographic location 502 (e.g., Israel) as determined by the mobile communication device. The user interface 500 displays a list 504 of emergency situations and risk categories from which an employee can select an emergency situation or risk category.

FIG. 6 shows an example of a user interface 600 of a mobile communication device for presenting emergency assistance information. The user interface 600 displays the identified emergency situation or category 602 (e.g., medical emergency). The user interface 600 displays emergency assistance information that was identified based on the emergency situation or category 602. The emergency assistance information may include offline information that was previously stored in a memory of the mobile communication device or online information retrieved from a server associated with the organization. The displayed offline information was also identified based on the employee's current geographic location (e.g., Israel as indicated in the user interface 500 of FIG. 5). The information in FIG. 6 includes a list 602 of identified emergency services facilities and associated emergency assistance information for the organization's emergency services facilities in Israel and for the medical emergency situation. The information includes links 604 to online content stored on a remote server associated with the organization.

A number of implementations have been described. Nevertheless, it will be understood that various modifications may be made. For example, other methods described herein besides or in addition to that illustrated in FIG. 4 may be performed. Further, the illustrated steps of process 400 may be performed in different orders, either concurrently or serially. Further, steps may be performed in addition to those illustrated in process 400, and some steps illustrated in process 400 may be omitted without deviating from the present disclosure. Accordingly, other implementations are within the scope of the following claims.

What is claimed is:

1. A computer-implemented method performed with a mobile communication device, the method comprising:
   receiving an indication to present information associated with an organization to an employee of the organization, the indication including a particular geographic location associated with two or more situations, each situation associated with a different risk category;
   in response to receiving the indication, determining i) a current geographic location of the employee and ii) a status of a data connection of the mobile communication device;
   determining that the particular geographic location corresponds to the current geographic location;
   in response to determining that the particular geographic location corresponds to the current geographic location, identifying a plurality of facilities associated with the organization based on the determined current geographic location of the employee;
   determining a situation associated with each facility of the plurality of facilities;
   comparing each situation of the two or more situations associated with the particular geographic location with the situation associated with each facility of the plurality of facilities;
   based on the comparing, identifying i) a first facility from the plurality of facilities that matches a first situation of the two or more situations associated with the particular geographic location and ii) a second facility from the plurality of facilitates that matches a second situation of the two or more situations associated with the particular geographic location, the first facility differing from the second facility;
   determining that the status of the data connection of the mobile communication device is online;
   in response to determining that the status of the data connection is online:
      i) receiving, from the mobile communications device, user input indicating a selection of one of the two or more situations associated with the particular geographic location,
      ii) retrieving information associated with the facility associated with the selected situation from a local memory of the mobile communication device, the information including offline links to online content provided by a remote server, and
      iii) retrieving online information for the facility associated with the selected situation from the remote server, the online information being retrieved via the offline links to online content; and
   providing the retrieved information to the mobile communications device.

2. The method of claim 1, further comprising:
   storing, for each facility of the plurality of facilities associated with the organization, information associated with the facility in the local memory of the mobile communication device prior to receiving the indication.

3. The method of claim 1, wherein receiving the indication to present information associated with the organization to the employee of the organization comprises:
   receiving an input from the employee for accessing information associated with the organization.

4. The method of claim 1, wherein receiving the indication to present information associated with the organization to the employee of the organization comprises:
   receiving a notification from a computing system of the organization to present information associated with the organization to the employee of the organization, the computing system being remote from the mobile communication device.

5. The method of claim 1, wherein determining the current geographic location of the employee comprises:
   determining the current geographic location of the mobile communication device using a global positioning system (GPS).

6. The method of claim 1, wherein identifying the plurality of facilities associated with the organization based on the determined current geographic location of the employee comprises:
   determining, for each facility of the plurality of facilities, a distance between a geographic location of the facility and the current geographic location of the employee, the geographic location of the facility being previously stored in the local memory of the mobile communication device; and
   identifying the plurality of facilities based on the determined distances.

7. The method of claim 1, wherein providing the retrieved information to the employee comprises:
   providing one or more links to information stored in a remote storage medium accessible by the mobile communication device, the one or more links being previously stored in the local memory of the mobile communication device.

8. The method of claim 1, further comprising determining that the status of the data connection of the mobile communication device is offline and in response, retrieving offline content associated with the facility from the local memory of the mobile communication device.

9. The method of claim 8, wherein the offline content includes emergency content information associated with the particular facility and the organization, and the online content includes descriptions, floor plans, images, and videos associated with the particular facility.

10. A non-transitory computer-readable storage medium encoded with a computer program, the program comprising instructions that when executed by one or more computers cause the one or more computers to perform operations comprising:
   receiving an indication to present information associated with an organization to an employee of the organization, the indication including a particular geographic location associated with two or more situations, each situation associated with a different risk category;
   in response to receiving the indication, determining i) a current geographic location of the employee and ii) a status of a data connection of the mobile communication device;
   determining that the particular geographic location corresponds to the current geographic location;
   in response to determining that the particular geographic location corresponds to the current geographic location, identifying a plurality of facilities associated with the organization based on the determined current geographic location of the employee;
   determining a situation associated with each facility of the plurality of facilities;
   comparing each situation of the two or more situations associated with the particular geographic location with the situation associated with each facility of the plurality of facilities;
   based on the comparing, identifying i) a first facility from the plurality of facilities that matches a first situation of the two or more situations associated with the particular geographic location and ii) a second facility from the plurality of facilitates that matches a second situation of the two or more situations associated with the particular geographic location, the first facility differing from the second facility;

determining that the status of the data connection of the mobile communication device is online;

in response to determining that the status of the data connection is online:
i) receiving, from the mobile communications device, user input indicating a selection of one of the two or more situations associated with the particular geographic location,
ii) retrieving information associated with the facility associated with the selected situation from a local memory of the mobile communication device, the information including offline links to online content provided by a remote server, and
iii) retrieving online information for the facility associated with the selected situation from the remote server, the online information being retrieved via the offline links to online content; and providing the retrieved information to the mobile communications device.

11. The non-transitory computer-readable storage medium of claim 10, wherein the operations further comprise:
storing, for each facility of the plurality of facilities associated with the organization, information associated with the facility in the local memory of the mobile communication device prior to receiving the indication.

12. The non-transitory computer-readable storage medium of claim 10, wherein receiving the indication to present information associated with the organization to the employee of the organization comprises:
receiving an input from the employee for accessing information associated with the organization.

13. The non-transitory computer-readable storage medium of claim 10, wherein receiving the indication to present information associated with the organization to the employee of the organization comprises:
receiving a notification from a computing system of the organization to present information associated with the organization to the employee of the organization, the computing system being remote from the mobile communication device.

14. The non-transitory computer-readable storage medium of claim 10, wherein determining the current geographic location of the employee comprises:
determining the current geographic location of the mobile communication device using a global positioning system (GPS).

15. The non-transitory computer-readable storage medium of claim 10, wherein identifying the plurality of facilities associated with the organization based on the determined current geographic location of the employee comprises:
determining, for each facility of the plurality of facilities, a distance between a geographic location of the facility and the current geographic location of the employee, the geographic location of the facility being previously stored in the local memory of the mobile communication device; and
identifying the plurality of facilities based on the determined distances.

16. The non-transitory computer-readable storage medium of claim 10, wherein providing the retrieved information to the employee comprises:
providing one or more links to information stored in a remote storage medium accessible by the mobile communication device, the one or more links being previously stored in the local memory of the mobile communication device.

17. A system of one or more computers configured to perform operations comprising:
receiving an indication to present information associated with an organization to an employee of the organization, the indication including a particular geographic location associated with two or more situations, each situation associated with a different risk category;

in response to receiving the indication, determining i) a current geographic location of the employee and ii) a status of a data connection of the mobile communication device;

determining that the particular geographic location corresponds to the current geographic location;

in response to determining that the particular geographic location corresponds to the current geographic location, identifying a plurality of facilities associated with the organization based on the determined current geographic location of the employee;

determining a situation associated with each facility of the plurality of facilities;

comparing each situation of the two or more situations associated with the particular geographic location with the situation associated with each facility of the plurality of facilities;

based on the comparing, identifying i) a first facility from the plurality of facilities that matches a first situation of the two or more situations associated with the particular geographic location and ii) a second facility from the plurality of facilitates that matches a second situation of the two or more situations associated with the particular geographic location, the first facility differing from the second facility;

determining that the status of the data connection of the mobile communication device is online;

in response to determining that the status of the data connection is online:
i) receiving, from the mobile communications device, user input indicating a selection of one of the two or more situations associated with the particular geographic location,
ii) retrieving information associated with the facility associated with the selected situation from a local memory of the mobile communication device, the information including offline links to online content provided by a remote server, and
iii) retrieving online information for the facility associated with the selected situation from the remote server, the online information being retrieved via the offline links to online content; and providing the retrieved information to the mobile communications device.

18. The system of claim 17, wherein the operations further comprise:
storing, for each facility of the plurality of facilities associated with the organization, information associated with the facility in the local memory of the mobile communication device prior to receiving the indication.

19. The system of claim 17, wherein receiving the indication to present information associated with the organization to the employee of the organization comprises:

receiving an input from the employee for accessing information associated with the organization.

20. The system of claim 17, wherein receiving the indication to present information associated with the organization to the employee of the organization comprises:

receiving a notification from a computing system of the organization to present information associated with the organization to the employee of the organization, the computing system being remote from the mobile communication device.

21. The system of claim 17, wherein determining the current geographic location of the employee comprises:

determining the current geographic location of the mobile communication device using a global positioning system (GPS).

22. The system of claim 17, wherein identifying the plurality of facilities associated with the organization based on the determined current geographic location of the employee comprises:

determining, for each facility of the plurality of facilities, a distance between a geographic location of the facility and the current geographic location of the employee, the geographic location of the facility being previously stored in the local memory of the mobile communication device; and identifying the plurality of facilities based on the determined distances.

23. The system of claim 17, wherein providing the retrieved information to the employee comprises:

providing one or more links to information stored in a remote storage medium accessible by the mobile communication device, the one or more links being previously stored in the local memory of the mobile communication device.

* * * * *